May 14, 1929. H. FOREMAN 1,712,880
DEMOUNTABLE RIM LOCK
Filed June 29, 1926
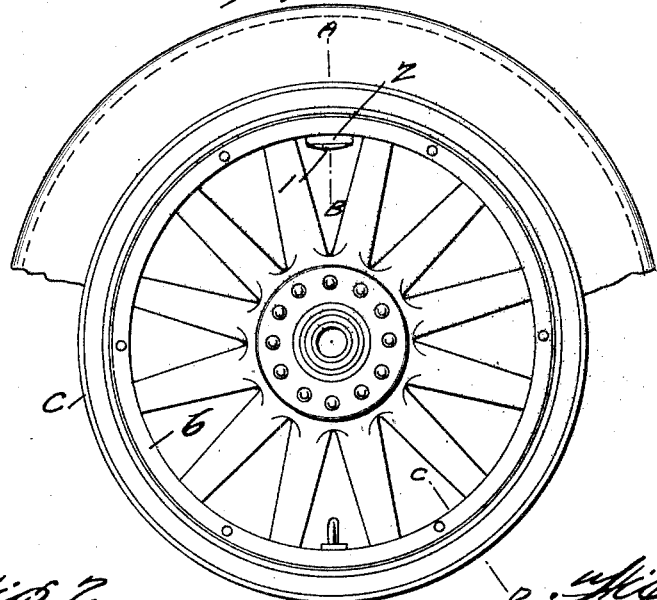
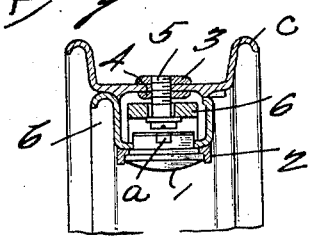
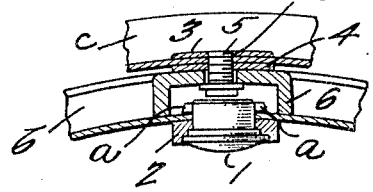
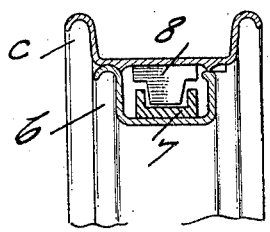
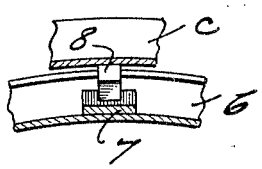
Inventor
Harry Foreman,
By Jenks Addleman.
Attorney Patented May 14, 1929.

1,712,880

UNITED STATES PATENT OFFICE.

HARRY FOREMAN, OF BLUE BALL, PENNSYLVANIA.

DEMOUNTABLE-RIM LOCK.

Application filed June 29, 1926. Serial No. 119,417.

This invention relates to demountable rims for automobile wheels, and particularly to means for securing a demountable rim against theft or accidental dislodgment of the rim from the wheel.

It is an object of this invention to provide novel means whereby a demountable rim may be anchored against lateral movement with respect to a felly or rim; and it is furthermore an object to provide means for securing the felly in place and for guarding the securing means against access thereto by unauthorized persons, a condition which will prevent theft of demountable rims and tires thereon, since the tires of demountable rims are usually not removable except when the demountable rim is collapsed or otherwise manipulated after it has been removed from the felly or rim.

It is a further object of this invention to provide reinforcing means where the securing means is anchored to the demountable rim.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a wheel showing a fragment of a tire and the lock applied thereto;

Figure 2 illustrates a sectional view on the line A—B of Fig. 1;

Figure 3 illustrates a central sectional view of the locking means with the lock in elevation;

Figure 4 illustrates a sectional view on the line C—D of Fig. 1; and

Figure 5 illustrates a central sectional view at right angles to that shown in Fig. 4.

In these drawings, 1 denotes a lock having latch or locking elements $a$ which are yieldably held outwardly to engage the inner surface of a rim $b$. The rim has an aperture and an apertured bushing 2 associated with the rim, it being shown that the barrel of the lock 1 projects through the aperture of the bushing and the aperture of the rim. The lock is intended, of course, to protect the demountable rim securing element in order that access may not be had to it by unauthorized persons.

In the present embodiment of the invention, the demountable rim $c$ has upper and lower reinforcing plates 3 and 4 apertured in alinement with an aperture $d$ in the demountable rim, and the walls of the apertures of the reinforcing plates and rim are threaded to receive the screw 5, whose head engages the bridge element 6 that is secured to the rim $b$, the bridge element being apertured to receive the shank of the screw in order that the screw may be threaded to hold the demountable rim against movement until the screw is removed. It is seen, of course, that the head of the screw bears against the surface of the bridge element so that the parts are anchored and the demountable rim is prevented from movement circumferentially or transversely. It is understood that when the lock is removed from the aperture of the rim, the screw may be manipulated by a driver or implement inserted through the aperture of the rim which is caused to engage the head of the screw.

At a location or locations remote from the lock, means are provided for preventing lateral movement of the demountable rim with respect to the stationary rim, and, in the present embodiment of the invention, where such means are provided, channeled irons or blocks 7 are secured. The rim $b$ has lugs or radially extending plates 8 secured to it which fit in the channel of the member 7, it being seen from an inspection of Fig. 4 that the edges of the element 8 extend into the channel of the member 7 and that the edges of the member 8 will engage the flanges or walls of the channel member and this will prevent transverse movement of the demountable rim with respect to the stationary rim.

The last described rim holding means are preferably located in such relation to the lock as to permit the demountable rim to be applied to the wheel rim with the parts interlocking or interengaging before that portion of the rim having the lock is placed on the rim, and those skilled in the art will, of course, understand that the manipulation of the demountable rim in this instance is similar to that practiced when the valve stem is to be placed in the aperture of the rim during the seating of the demountable rim.

It has been found in practice that a device embodying the invention is effective to prevent theft of automobile tires and rims and it guards against accidental displacement thereof and aids the demountable rim holding means of conventional type in retaining the said demountable rim on the wheel.

I claim:

1. A demountable tire carrying rim provided with an opening therethrough, disks which surround the opening through the rim, said opening being screw threaded, an apertured bridge element, a bolt for engagement with the bridge element and the screw threaded plates, a carrier rim having a lock receiving opening which is spanned by the bridge element, and a lock maintained in removable engagement with the carrier rim.

2. In a demountable rim lock, a demountable rim, anchoring means secured thereto, a carrier rim, means for associating the anchoring means and the carrier rim, a bridging element for holding the rim against movement, and removably secured means for preventing access to the anchoring means.

3. In a demountable rim lock, a demountable rim having an aperture, apertured reinforcing plates on each side of the apertured part of the rim, coinciding apertures being threaded, a bridging member having an aperture therethrough, a screw for engagement with the bridging element and the threads of the plates and rim, an opening through the carrier rim, and a lock for closing the opening through the carrier rim.

4. In a demountable rim lock, a demountable rim having therethrough an aperture, apertured and screw threaded reinforcing plates on opposite sides of the aperture through the demountable rim, an apertured carrier rim, an apertured bridging element associated with the demountable rim, a screw for engagement with the reinforcing plates and the bridging element, an opening through the carrier rim which is overlaid by the bridging element, and a removable lock for closing the opening through the carrier rim.

HARRY FOREMAN.